US009020976B2

(12) United States Patent
Ahmed et al.

(10) Patent No.: US 9,020,976 B2
(45) Date of Patent: Apr. 28, 2015

(54) SYSTEM AND METHOD FOR PROCESSING DATA IN DIVERSE STORAGE SYSTEMS

(75) Inventors: Istiak Ahmed, Plano, TX (US); Mohammed Masudul Haque Mondle, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 16 days.

(21) Appl. No.: 13/362,570

(22) Filed: Jan. 31, 2012

(65) Prior Publication Data
US 2013/0198238 A1 Aug. 1, 2013

(51) Int. Cl.
*G06F 17/30* (2006.01)
*G06F 7/00* (2006.01)

(52) U.S. Cl.
CPC . *G06F 7/00* (2013.01); *G06F 17/30* (2013.01)

(58) Field of Classification Search
USPC ...................................... 707/2, 3, 796; 704/4
See application file for complete search history.

(56) References Cited

U.S. PATENT DOCUMENTS

| 5,926,816 | A  | * | 7/1999 | Bauer et al. ........................ 1/1 |
| 2006/0212465 | A1 | * | 9/2006 | Fish et al. ..................... 707/101 |
| 2007/0083541 | A1 | * | 4/2007 | Fraleigh et al. ............... 707/102 |
| 2008/0195374 | A1 | * | 8/2008 | Holubar et al. .................. 704/4 |

* cited by examiner

*Primary Examiner* — Etienne Leroux
(74) *Attorney, Agent, or Firm* — Michael A. Springs

(57) ABSTRACT

In an exemplary embodiment, a system includes a memory and a processor communicatively couple to the memory. The processor is operable to receive a first indication that a first database table is selected from a plurality of database tables, wherein each database table is comprised of rows and columns, and retrieve a first plurality of columns, wherein each column is associated with the first database table. The processor is further operable to facilitate the display of the first plurality of columns, receive a second indication that a first column is selected from the first plurality of columns, and receive a third indication that at least one cell in the first column is selected. The processor is further operable to receive an expected data set, store the expected data set in the at least one cell, and compare a sample data set to the expected data set.

12 Claims, 11 Drawing Sheets

```
                    <?xml version="1.0" encoding="utf-8" ?>
                     - <sqlquery>
302                  - <single_query>
304  <member datatype="text" name="query1">update test set lastName = 'abc'
                     where firstName = 'efg'</member>
306   <member datatype="text" name="query2">Delete from test43 where
                     firstName = 'hij'</member>
                     </single_query>
308                  - <compare_query>
                     - <member datatype="text" name="case1">
310        <sql1>select name, empid, empnbr from testtemp</sql1>
312        <sql2>select name, empid, empnbr from test01</sql2>
                     </member>
                     - <member datatype="text" name="case2">
314        <sql1>select name, empid, empnbr from test01</sql1>
316        <sql2>select name, empid, embnbr from test02</sql2>
                     </member>
                     </compare_query>
                     </sqlquery>
```

*FIG. 3*

SYSTEM AND METHOD FOR PROCESSING DATA IN DIVERSE STORAGE SYSTEMS

TECHNICAL FIELD OF THE INVENTION

This invention relates generally to data processing and, more specifically, to a system and process for processing data in diverse storage systems.

BACKGROUND OF THE INVENTION

An enterprise may handle a large quantity of data on a daily basis. The data and the storage systems storing that data may grow in size and complexity as the enterprise grows. Over time, it may be desirable for the enterprise to efficiently and effectively maintain, process, test, and otherwise interact with its data which may be stored across a variety of storage platforms.

SUMMARY OF THE INVENTION

According to embodiments of the present disclose, disadvantages, and problems associated with previous data manipulation and verification systems may be reduced or eliminated.

In certain embodiments, a system includes a memory and a processor communicatively couple to the memory. The processor is operable to receive a first indication that a first database table is selected from a plurality of database tables, wherein each database table is comprised of rows and columns, and retrieve a first plurality of columns, wherein each column is associated with the first database table. The processor is further operable to facilitate the display of the first plurality of columns, receive a second indication that a first column is selected from the first plurality of columns, and receive a third indication that at least one cell in the first column is selected. The processor is further operable to receive an expected data set, store the expected data set in the at least one cell, receive a sample data set, and compare the sample data set to the expected data set. The processor is also operable to store the result of the comparison of the sample data set.

Particular embodiments of the present disclosure may provide some, none, or all of the following technical advantages. For example, certain embodiments can provide enhanced accessibility to employees of an enterprise by interfacing with multiple data sources. In such embodiments, an employee may not have knowledge of any programming language to store, access, or manipulate data that is located in an enterprise's data storage system. As another example, certain embodiments provide data verification and reporting services for data contents from a variety of data sources. In such embodiments, an employee of an enterprise can execute comparisons between data from diverse data sources easily and efficiently. Additionally, certain embodiments provide for the ability to execute a large number of database queries from a single source. In such embodiments, repetitive interaction with one or more databases is eliminated saving an enterprise time and other resources.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings in which:

FIG. 3 illustrates example comparison data;

DETAILED DESCRIPTION OF THE INVENTION

Certain embodiments of the present disclosure provide techniques for manipulating and verifying data for applications. FIGS. 1 through 8 below illustrate systems and methods for processing, updating, and verifying data for applications.

Figure 1:
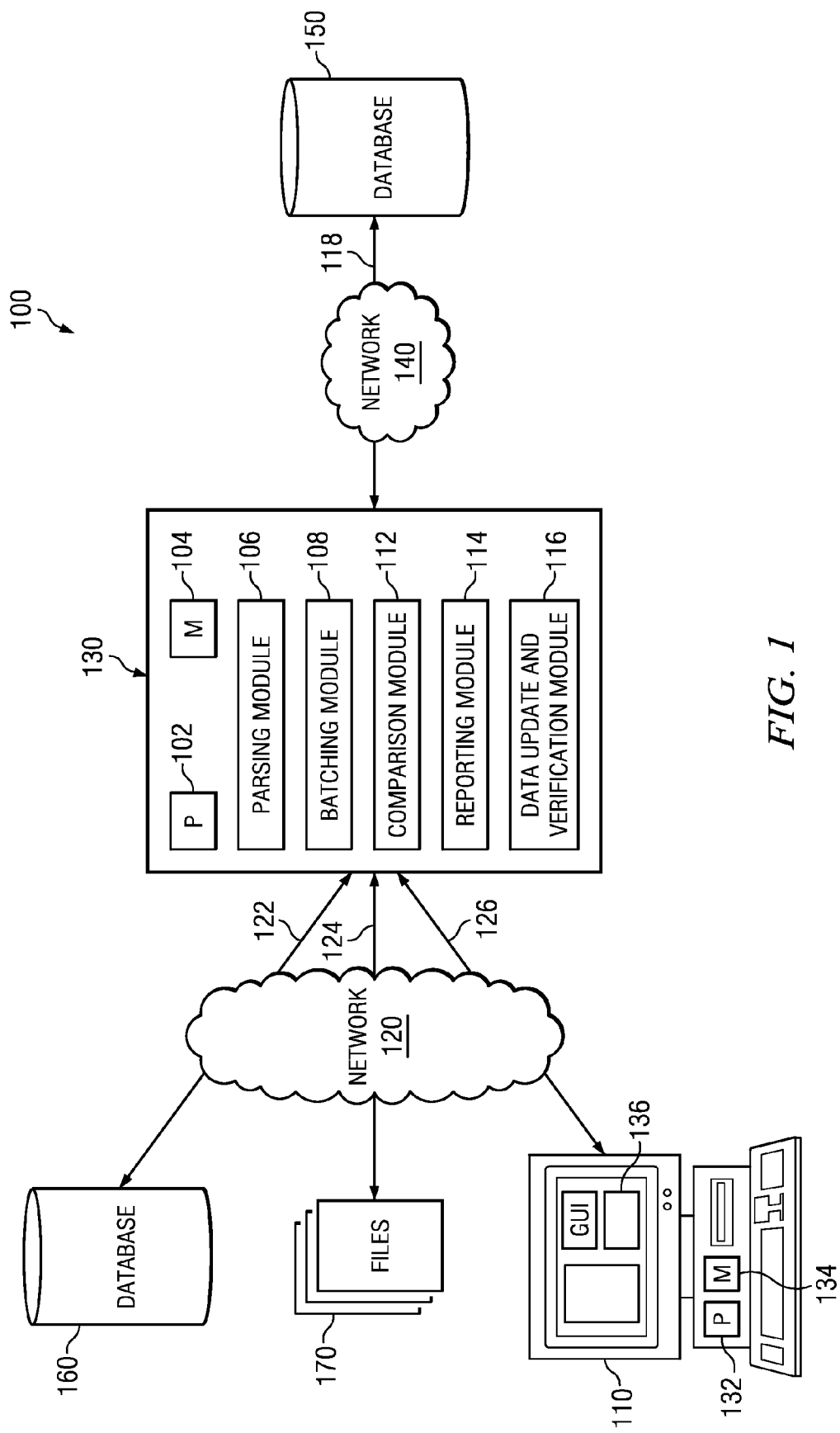
FIG. 1 illustrates an example data verification system according to certain embodiments.

FIG. 1 illustrates an example data verification system according to certain embodiments. In general, data manipulation and verification is used by any entity that develops or uses computer applications that process data. For example, an entity such as an enterprise may process and store a large quantity of data. In particular, data verification system 100 includes workstation 110, networks 120 and 140, data processing environment 130, target database 150, source database 160, and input file 170.

Generally workstation 110 can be used by a user to create, alter, and/or verify any data in data verification system 100. More specifically, workstation 110 represents any suitable, local, or remote device that may be used by a user to access one or more elements of data verification system 100. Workstation 110 may comprise processor 132, memory 134, and graphical user interface (GUI) 136. For example, workstation 110 may be a computer, telephone, internet browser, electronic notebook, personal digital system (PDA), pager, or any other suitable device (wireless, wireline, or otherwise), component, or element capable of receiving processing, storing, and/or communicating information with other components of data verification system 100.

Processor 132 may include one or more microprocessors, controllers, or any other suitable computing devices or resources. Processor 132 may work, either alone or with components of data verification system 100, to provide a portion or all of the functionality of data verification system 100 described herein. Processor 132 communicatively couples to memory 134. Memory 134 may take the form of volatile or non-volatile memory including, without limitation, magnetic media, optical media, RAM, ROM, removable media, or any other suitable memory component. In certain embodiments, a portion or all of memory 134 may store one or more database data structures, such as one or more structured query language (SQL) servers or relational databases.

In certain embodiments, memory 134 may be internal or external to processor 132 and may include one or more instruction caches or one or more data caches. Instructions in the instruction caches may be copies of instructions in memory 134, and the instruction caches may speed up retrieval of those instructions by processor 132. Data in the data caches may include any suitable combination of copies of data in memory 134 for instructions executing at processor 132 to operate on, the results of previous instructions executed at processor 132 for access by subsequent instructions executing at processor 132, or for writing to memory 134, and/or any other suitable data. The data caches may speed up read or write operations by processor 132.

In some embodiments, workstation 110 may comprise GUI 136. GUI 136 is generally operable to tailor and filter data represented to a user. In certain embodiments, GUI 136 may present a user with an interface to interact with any component of data verification system 100. For example, using GUI 136, a user may access, store, edit, and/or verify particular data in data verification system 100. In certain embodiments, a user may be able to use workstation 110 to configure data processing environment 130, target database 150, source database 160, input file 170, or any other component of data verification system 100 suitable for a particular purpose. GUI 136 may comprise a plurality of displays having interactive fields, pull-down lists, and buttons operated by a user. GUI 136 may include multiple levels of abstraction including groups and boundaries.

Data verification system 100 may include data processing environment 130. Data processing environment 130 may be any environment that facilitates the storing, processing, and/or verification of data. In certain embodiments, data processing environment 130 may comprise processor 102 and memory 104. Processor 102 may include one or more microprocessors, controllers, or any other suitable computing devices or resources. Processor 102 may work, either alone or with components of data verification system 100, to provide a portion or all of the functionality of data verification system 100 described herein. Processor 102 communicatively couples to memory 104. Memory 104 may take the form of volatile or non-volatile memory including, without limitation, magnetic media, optical media, RAM, ROM, removable media, or any other suitable memory component. In certain embodiments, a portion or all of memory 104 may store one or more database data structures, such as one or more structured query language (SQL) servers or relational databases.

In certain embodiments, memory 104 may be internal or external to processor 102 and may include one or more instruction caches or one or more data caches. Instructions in the instruction caches may be copies of instructions in memory 104, and the instruction caches may speed up retrieval of those instructions by processor 102. Data in the data caches may include any suitable combination of copies of data in memory 104 for instructions executing at processor 102 to operate on, the results of previous instructions executed at processor 102 for access by subsequent instructions executing at processor 102, or for writing to memory 104, and/or any other suitable data. The data caches may speed up read or write operations by processor 102.

According to some embodiments, data processing environment 130 may further comprise parsing module 106, batching module 108, comparison module 112, reporting module 114, and data update and verification module 116. Parsing module 106 may be any combination of software, hardware, and/or controlling logic capable of processing the contents of a particular data file, a particular database, or any other source of data suitable for a particular purpose. Parsing module 106 is capable of accessing and preparing a source of data for implementation in data processing environment 130. Parsing module 106 may access data from a particular source and determine the format of the data. For example, parsing module 106 may be capable of determining whether the data is delimited, has a particular fixed length, has instructions for storing at a particular destination, or has any other information suitable for a particular purpose. Parsing module 106 is capable of determining a variety of information about data from a particular source. In certain embodiments, information about data from a particular source may be provided to parsing module 106 via a user using GUI 136 of workstation 110. Parsing module 106 is capable of processing a text file, an extensible markup language file, data in a database, a comma separated values file, a spreadsheet, or any other format suitable for a particular purpose. In certain embodiments, parsing module 106 may be instructed to process only a portion of data from a particular data source. For example, parsing module 106 may process data contained only in particular rows or columns from a database. Parsing module 106 is capable of storing the processed data in a target location. For example, the target location may be a data file or a database. Parsing module 106 may also be capable of storing particular actions undertaken on source data and retrieving those actions at a later time.

Data processing environment 130 may also include batching module 108. Generally, batching module 108 will allow a user to run a group of SQL queries that may be stored in a particular file or database. In particular, batching module 108 is capable of extracting and then executing one or more SQL queries from a collection of queries. For example, batching module 108 may extract SQL queries from a text file, an extensible markup language file, a comma separated values file, a spreadsheet, or any other format suitable for a particular purpose. After extracting one or more queries from a particular file, batching module 108 may also allow a user to execute selected queries. For example, a user may be able to use GUI 136 of workstation 110 to access a particular file containing SQL queries. Using GUI 136 of workstation 110, a user can then extract a select number of queries from the specified file and instruct batching module 108 to execute those selected queries. Batching module 108 may also be capable of storing particular actions undertaken with the collection of queries and retrieving those actions at a later time.

Comparison module 112 will now be discussed. A user may use comparison module 112 of data processing environment 130 to compare data from different sources. In particular, comparison module 112 may be any combination of software, hardware, and/or controlling logic that allows data processing environment 130 or any other suitable component of data verification system 100 to obtain and compare data. Comparison module 112 may reside in data processing environment 130, workstation 110, or any other suitable component of data verification system 100. In certain embodiments, comparison module 112 may be software in memory 104. As an example, a user may use GUI 136 of workstation 110 to access comparison module 112. A user may specify a source of data to comparison module 112 using GUI 136. A user may also specify a target source of data to comparison module 112 using GUI 136. In certain embodiments, the source data may be retrieved from data file 170 or source database 160. According to some embodiments, target database may be target database 150.

A user may instruct comparison module 112, using GUI 136 of workstation 110, for example, as to how to carry out the comparison. According to some embodiments, a user may specify to comparison module 112 to compare one portion of data contained in the source data location to another portion of data contained in the target data location. For example, a user may instruct comparison module 112 to compare one or more columns of data from the source data location to one or more columns in the target data location. Comparison module 112 may then use this information to map data from the source data location to data contained at the target data location. As an example, a user may specify to comparison module 112, using GUI 136, that a particular column in source database 160 corresponds to a particular column in target database 150. In certain embodiments, comparison module 112 may use a data mapping file to map data from the source location to data stored in the target location. The data mapping file may be stored with files 170, memory 134, memory 104, or any other storage location suitable for a particular purpose.

Comparison module 112 may also be capable of comparing data from a source data location to data in a target data location by executing a particular SQL query or queries. Executing a particular SQL query may access some or all data stored in one or more databases. For example, a user may specify the path of input file 170 containing one or more SQL queries that can be used to compare data. Using a specified SQL query, comparison module 112 can then execute the comparison SQL query and determine whether the data contained in the source data location matches the data contained in the target data location. Additionally, comparison module 112 may be capable of combining data from the source data location and data from target data location into one set of data. For example, a user may desire to compare data from the source data location to data in a target data location and then output all data that matches. A user is able to specify to comparison module 112, using GUI 136, which portions of the source data location should be combined with which portions of the target data location.

Data processing environment 130 may also include reporting module 114. Reporting module 114 may be any combination of software, hardware, and/or controlling logic that allows data processing environment 130 to communicate the results of any action undertaken by data processing environment 130 or any other component of data verification system 100. Reporting module 114 may reside in memory 104 in data processing environment 130 or any other component of data verification system 100 suitable for any particular purpose. In certain embodiments, reporting module 114 may be software stored in memory 104 of data processing environment 130. Reporting module 114 is capable of providing information regarding any functionality of data processing environment 130. For example, reporting module 114 may output results of a particular function undertaken by data processing environment 130 to a database or a file. A user may be able to specify a target location for the report using GUI 136 of workstation 110. Furthermore, reporting module 114 is capable of displaying the results of an action undertaken by data processing environment 130 in GUI 136 of workstation 110.

Data processing environment 130 may also contain data update and verification module 116. Data update and verification module 116 may be any combination of software, hardware, and/or controlling logic that allows the storing, alteration, and/or verification of data in data verification system 100. Data update and verification module 116 may reside in data processing environment 130, workstation 110, or any other suitable component of data verification system 100. In certain embodiments, data update and verification module 116 may be software stored in memory 104. For example, data processing environment 130 may allow the user to access the various functionalities of data update and verification module 116 using GUI 136 of workstation 110. Generally, the purpose of data update and verification module 116 is to allow users to update table data and verify the updated data against expected results without having to write any SQL queries. For example, data update and verification module 116 is capable of updating one or more tables in a particular database. In certain embodiments, a particular database may be target database 150 or source database 160. Data update and verification module 116 may receive a particular source to update from a user using GUI 136 of workstation 110.

Data update and verification module 116 is capable of presenting various portions of the source data to a user allowing the user to select a certain portion to update. The user may use GUI 136 to select a specific portion of the source data to update. For example, a user may specify a table name in a database to data update and verification module 116. Data update and verification module 116 may display all the columns of a particular table. A user may use GUI 136 to select one or more cells contained in the in one or more columns in the source data and provide data update and verification module 116 with an updated data value for those one or more cells. In certain embodiments, data update and verification module 116 may be capable of storing expected data. For example, expected data may be some data that a user of data verification system 100 has deemed to be "correct" and is used as baseline data. Expected data can then be used by data update and verification module 116 or any other component of data processing environment 130 to compare or verify data. In certain embodiments, data update and verification module 116 may store expected data in file 170, in source database 160, or in target database 150. Data update and verification module 116 is capable of retrieving previously stored expected data for later verification and comparison of updated data.

Data verification system 100 may contain one or more databases. For example, data verification system 100 may contain target database 150 and source database 160. Target database 150 and source database 160 may be any repository capable of storing data. In certain embodiments, target database 150 and source database 160 may be a collection of interrelated tables in a relational database. Data verification system 100 may also contain one or more input files 170. Input file 170 may be a text file, an extensible markup language file, a collection of database SQL queries, a common separated values file, a spreadsheet, or any other format suitable for a particular purpose. For example, input file 170 may be any source of data to be processed, stored, or verified by data processing environment 130 or any other component of data verification system 100 suitable for any particular purpose.

Example operations of data verification system 100 will now be discussed. Data verification system 100 may provide a variety of functions. For example, data verification system may provide file parsing functionality through the use of parsing module 106. Parsing module 106 may be used to process particular data from a data source such as a database or a data file. In certain embodiments, parsing module 106 may process data from source database 160 or data from input file 170. Parsing module 106 may determine a source location of the data to be processed. In certain embodiments, a user may use GUI 136 of workstation 110 to specify a source location of data to be processed by parsing module 106. Workstation 110 may communicate message 126 to data processing environment 130. Message 126 may comprise a request to process a particular source of data. In response to message 126, parsing module 106 may access the particular source of data. Additionally, a user may use GUI 136 of workstation 110 to specify a data format of the source data. For example, a user may use GUI 136 to specify whether the data is delimited by a specific character and/or whether the data has a specific length. A user may also specify whether the source data includes a row of headers corresponding to columns in target database 150. Furthermore, a user may use GUI 136 of workstation 110 to specify information regarding target database 150. For example, a user may type in a particular table of target database 150 which will store the data from a data source.

Workstation 110 may communicate some or all information regarding the source data and target database 150 by communicating message 126 over network 120 to data processing environment 130. Parsing module 106 may then use information contained in message 126 to process the data from the source data according to the parameters specified by the user. After processing the data according to the user's specifications, parsing module 106 may then store the data at a target destination. For example, parsing module 106 may access input file 170 by communicating message 124 over network 120 to files 170. Message 124 may contain a request to access files 170. In response to message 124, parsing module 106 may access files 170.

Similarly, parsing module 106 may determine that source data is located in source database 160. Parsing module 106 may communicate message 122 over network 120 to source database 160. Message 122 may comprise a request to access source database 160. In response to message 122, parsing module 106 may then access data contained in database 160. Parsing module 106 may then process the source data according to processing information received from the user. Parsing module 106 may store the processed source data at a specified target location. For example, parsing module 106 may be instructed to store the processed source data in target database 150. Parsing module 106 may communicate message 118 over network 140 to target database 150. Message 118 may contain a request to store processed source data in a particular portion of target database 150. In response to message 118, processed source data may be stored in target database 150.

Another functionality provided by data verification system 100 is executing multiple SQL queries. Data processing environment 130 may allow a user to execute multiple SQL queries through batching module 108. Batching module 108 may receive a location containing one or more SQL queries. For example, a user may use GUI 136 of workstation 110 to specify a particular location of input file 170. Workstation 110 may communicate message 126 to data processing environment 130. Message 126 may comprise a request to process input file 170. In response, batching module 108 may access input file 170. Batching module 108 may then process input file 170. For example, batching module 108 may analyze the contents of input file 170 and extract one or more SQL queries from input file 170. Batching module 108 may then communicate message 126 to workstation 110. Message 126 may comprise a request to display the various contents of input file 170. In response, the SQL queries extracted from input file 170 may be displayed in GUI 136 of workstation 110. A user may then use GUI 136 to select one or more SQL queries presented in GUI 136. After selecting one or more of the extracted SQL queries from input file 170, a user may then instruct batching module 108 to execute the selected SQL queries. For example, a user may use GUI 136 of workstation 110 to select one or more SQL queries extracted from input files 170. Workstation 110 may then communicate message 126 to data processing environment 130, message 126 comprising a request to execute the one or more SQL queries contained in message 126. In response, batching module 108 may execute the SQL queries contained in message 126.

Data verification system 100 may also allow the comparison of two collections of data using comparison module 112. Comparison module 112 is capable of comparing one set of data to another set of data and outputting the results of that comparison. Comparison module 112 may receive a location for source data. In certain embodiments, the location of source data may be for input file 170 or source database 160. For example, a user may use GUI 136 of workstation 110 to specify a particular source file location. Workstation 110 may communicate message 126 over network 120 to data processing environment 130, message 126 comprising a source data location as well as a request to compare two collections of data. In response, comparison module 112 may gain access to data at the source location.

Comparison module 112 may then present the structure of the source data to a user. For example, comparison module 112 may communicate message 126 over network 120 instructing GUI 136 to display the structure of the collection of source data. In certain embodiments, displaying the structure of the source data may comprise displaying columns of the table containing the source data. The user may also specify a location of target data. In certain embodiments, the location of the target data may be the location for target database 150. The user may input the location of target data using GUI 136 of workstation 110. Workstation 110 may communicate message 126 over network 120 to data processing environment 130. Message 126 may comprise the location of the target data. Comparison module 112 may then, in response to message 126, access data at the location for target data. For example, comparison module 112 may take the location of a target data and communicate message 118 over network 140 to target database 150. In response, comparison module 112 may gain access to target database 150. Comparison module 112 may collect information regarding the structure of the collection of target data. After collecting this information, comparison module 112 may then communicate message 126 to workstation 110. Message 126 may comprise the structure of the collection of target data to be displayed in the GUI 136. In certain embodiments, the structure of the collection of target data may comprise the columns of the table containing the target data in target database 150.

A user may use GUI 136 of workstation 110 to signify which portions of the source data correspond to which portions of the target data. In certain embodiments, the user may use GUI 136 to select one or more columns of one or more tables containing the source data. The user can use GUI 136 to specify one or more columns containing target data, wherein the columns containing target data corresponding to the columns containing source data. Workstation 110 can communicate message 126 to data processing environment 130, message 126 containing the user's mapping of the structure containing source data to the structure containing target data.

A user may also specify one or more comparison SQL queries for data processing environment 130 to execute. For example, a user may specify a file containing one or more SQL queries using GUI 136 of workstation 110. Workstation 110 may communicate message 126 to data processing environment 130. Message 126 may include the file location of a file containing one or more comparison SQL queries. In response, comparison module 112 may access the file containing the one or more comparison SQL queries. Comparison module 112 may then instruct GUI 136 to display the one or more SQL queries contained in the file at the specified location.

A user can use GUI 136 to select one or more comparison SQL queries to compare the source data to the target data. For example, a user may use GUI 136 of workstation 110 to specify one or more comparison SQL queries. Workstation 110 may then communicate message 126 to data processing environment 130, message 126 including the one or more comparison SQL queries. In response, comparison module 112 may determine whether the source and target data match by executing the one or more comparison SQL queries. Furthermore, comparison module 112 may store the results of the comparisons in memory 104 or any other storage location suitable for a particular purpose.

After one or more functions have been performed by data processing environment 130, data processing environment 130 may provide results to a user via reporting module 114. For example, a user may use GUI 136 of workstation 110 to specify a destination for communicating results generated by the components of data processing environment 130 or any other component of data verification system 100. In certain embodiments, reporting module 114 may communicate results to a particular database. For example, a user may use GUI 136 of workstation 110 to specify a particular database to store results generated by any component of data processing environment 130. A user may type in the location of the particular database using GUI 136. Workstation 110 may then communicate message 126 over network 120 to data processing environment 130. Message 126 may comprise the location of a particular database to store the results as specified by the user.

In certain embodiments, reporting module 114 may store the results generated by a component of data processing environment 130 in a file. For example, a user may use GUI 136 of workstation 110 to input a file location to store results generated by a component of data processing environment 130. Workstation 110 may communicate message 126 to data processing environment 130. Message 126 may contain a location of a file where results should be stored. Additionally, a user may specify the results generated by a component of data processing environment 130 should be emailed to a particular email address. As such, a user may use GUI 136 of workstation 110 to specify that the results generated by a component of data processing environment 130 should be emailed to a particular email address. A user may input the email address using GUI 136 or the user may instruct data processing environment 130 to use an email address stored in a configuration file. Workstation 110 may then communicate message 126 over network 120 to data processing environment 130. Message 126 may contain a user's preference for email reporting. In response to message 126, reporting module 114 may communicate the results of a particular component of data processing environment 130 according to the user's preference. For example, a user may have specified target database 150 as the destination to store results generated by a component of data processing environment 130. Reporting module 114 may communicate message 118 over network 140 to target database 150. Message 118 may contain the results of a function implemented by data processing environment 130. In certain embodiments, message 118 may simply contain user preferences for reporting results generated by a component of data processing environment 130.

Data processing environment 130 may also allow a user to store, update, and/or verify particular data using data update and verification module 116. Data update and verification module may receive table information regarding a table and a database that might store a portion of data. In certain embodiments, a user may use GUI 136 of workstation 110 to specify a particular table that is the target location for storing certain data. Workstation 110 may communicate message 126 to data processing environment 130. Message 126 may contain information regarding a table which is the destination for storing data. In response to message 126, data update and verification module 116 may access the table and retrieve the structure of the table. For example, data update and verification module 116 may communicate message 118 over network 140 to target database 150. Message 118 may comprise a request to access the table specified by the user. In response to message 118, data update and verification module 116 may have access to database 150. Data update and verification module 116 may then communicate message 126 to workstation 110. Message 126 may contain information regarding the structure of the destination table. In response to message 126, GUI 136 may present a list of columns of the destination table to a user for selection of a particular column.

A user may use GUI 136 to choose particular columns of data for data processing environment 130 to retrieve. Workstation 110 may then communicate message 126 over network 120 to data processing environment 130, message 126 containing columns of the destination table selected by the user. In response to message 126, data update and verification module 116 may communicate message 118 over network 140 to target database 150. Message 118 may comprise a request to access the portions of database 150 containing the selected columns. In response to message 118, data update and verification module 116 may then have access to the data contained in the selected columns of target database 150. Data update and verification module 116 may then communicate message 126 to workstation 110. Message 126 may be a request to display the data in the selected columns in GUI 136. In response to message 126, GUI 136 may display the data of the selected columns of target database 150. In certain embodiments, this data may be presented as rows and columns with each intersection of a row and a column forming a cell of data. In certain embodiments, a user may repeat the process to add data from one or more columns of tables in target database 150.

Once a user has selected all the desired columns of tables stored in target database 150, a user may begin to select particular cells of data to update. For example, a user may use GUI 136 to select one or more cells of data to update. After selecting one or more cells, the user may enter a value that should replace the current value held in those particular cells. Workstation 110 may communicate message 126 to data processing environment 130 after the user finishes entering data to replace the data currently held in the selected cells. Message 126 may contain a reference to the particular cells that the user wants to update and the particular data that the user wants to store in those selected cells. In response to message 126, data update and verification module may communicate message 118 to target database 150 to update the selected cells according to the user's input.

In certain embodiments, a user may want to store a set of data that may be the expected results of a particular process. In such an embodiment, a user may use GUI 136 to communicate to data processing environment 130 that the data being entered into GUI 136 is intended to be set as the expected results data. Expected results data may be any data that is deemed to be "correct" data. Data processing environment 130 may then compare a particular set of data against the expected results data to determine whether the particular set of data is "correct" as well. In certain embodiments, if the data being stored by the user is not intended to be the expected result, data update and verification module 116 may store the data updates in an external file. For example, data update and verification module 116 may write the results into a file corresponding to the database structure of target database 150. Data update and verification module 116 may compare the data in this file to the data of target database 150 which contains the expected results data. If the data in the external file matches the expected results data held in target database 150, then data update and verification module 116 may deem the data in that file verified. Data update and verification module 116 may then output the results of this verification. In certain embodiments, data update and verification module 116 may communicate these results using reporting module 114.

Any component of data verification system 100 may include an interface, logic, memory, and other suitable elements. An interface receives input, sends output, processes the input and/or output and/or performs other suitable operations. An interface may comprise hardware and/or software. Logic performs the operation of the component. For example, logic executes instructions to generate output from input. Logic may include hardware, software, and/or other logic. Logic may be encoded in one or more non-transitory media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of data verification system 100.

Particular embodiments of the present disclosure may provide some, none, or all of the following technical advantages. For example, certain embodiments can provide enhanced accessibility to employees of an enterprise by interfacing with multiple data sources. In such embodiments, an employee may not have knowledge of any programming language to store, access, or manipulate data that resides in an enterprise's data storage system. As another example, certain embodiments provide data verification and reporting services for data contents from a variety of data sources. In such embodiments, an employee of an enterprise can execute comparisons between data from diverse data sources easily and efficiently. Additionally, certain embodiments provide for the ability to execute a large number of database queries from a single source. In such embodiments, repetitive interaction with one or more databases is eliminated saving an enterprise time and other resources.

Figure 2A:
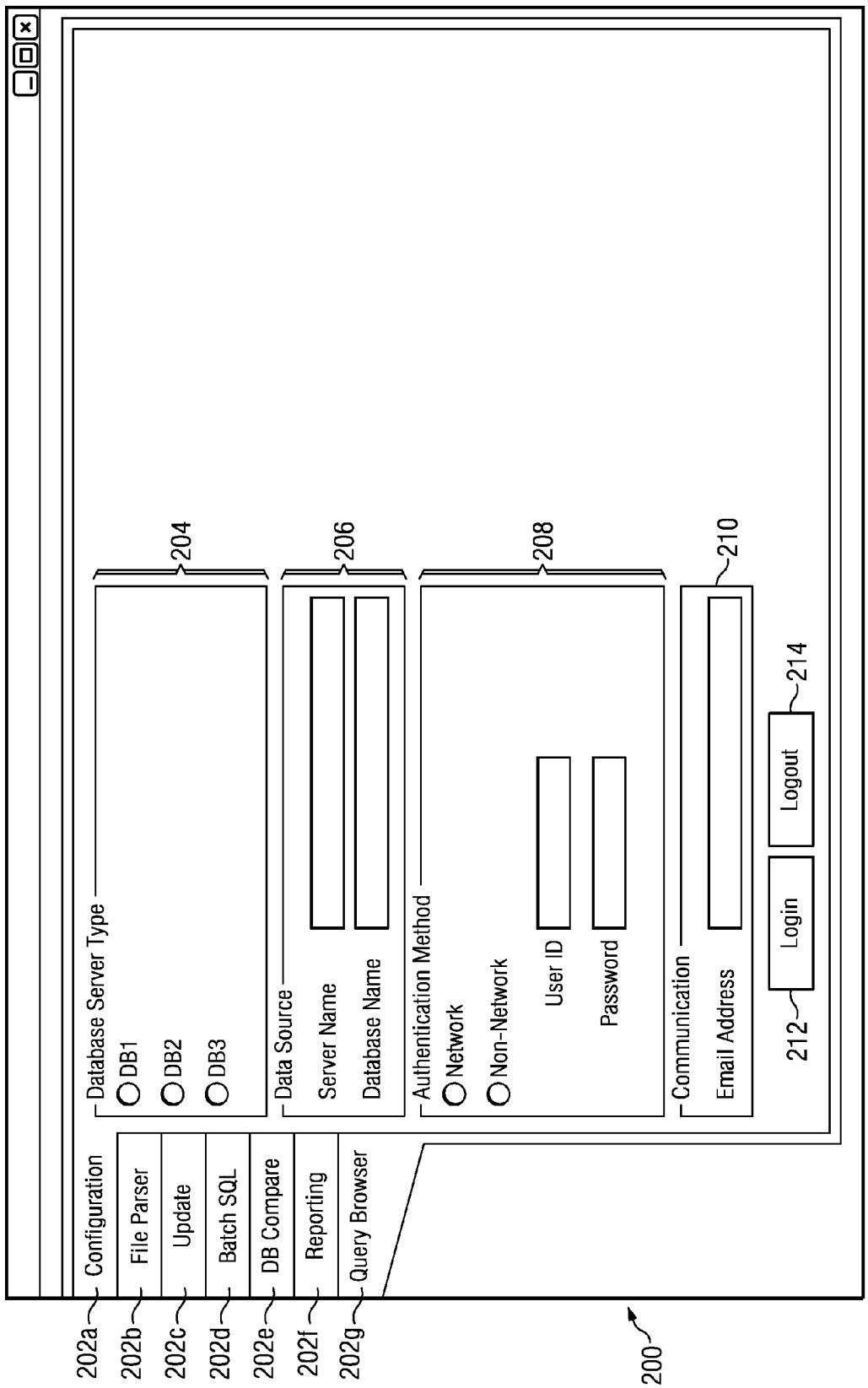
FIG. 2A illustrates an example interface for a configuration module.

FIG. 2A illustrates an example interface for a configuration module. A user may use interface 200 to configure any portion of data processing environment 130. In certain embodiments, interface 200 may be a part of GUI 136 on workstation 110. Interface 200 may contain any information useful for a user to update the configuration of any component of data processing environment 130. Interface 200 may include function tabs 202. Function tabs 202 allow the user to navigate to the various portions of interface 200. Each function tab 202 may give the user access to a different functionality of data processing environment 130. In the illustrated example, function tab 202*a* is selected signifying the user is able to use the configuration functionality of data processing environment 130.

Interface 200 may include server type 204. Server type 204 may signify a particular type of database that a user desires to use in conjunction with data processing environment 130. Server type 204 may be any graphical element of interface 200 that allows a user to choose a particular database server type. In the illustrated example, server type 204 is depicted as radio buttons which a user may click to select a particular server type 204. Interface 200 may also include data source 206. Data source 206 may be any information specifying a particular database with which data processing environment 130 may interact. Data source 206 may allow a user to specify database information such as server name and database name. In the illustrated example, data source 206 includes a text entry box for a sever name and a text entry box for database name which allows a user to enter text input for server name and database name.

Interface 200 may also include graphical elements that allow a user to specify an authentication method for authenticating data processing environment 130 to a particular database. For example, a particular database may reside in the network of data processing environment 130 and may not require an authentication to be specified by the user. In some instances, a particular database may not reside in the same network as data processing environment 130 and may require a use login and password. Authentication method 208 contains graphical elements that allow a user to specify authentication information. In the illustrated example, authentication method 208 includes radio buttons that allow a user to choose between a network database and a non-network database. Furthermore, if a user chooses a non-network database, authentication method 208 contains graphical elements of text boxes that allow a user to input a database user ID and a database password.

Interface 200 may also include a graphical element that allows a user to input email address 210. Email address 210 may be any email address that the user wants to specify that receives information produced by data processing environment 130. For example, email address 210 may be a destination which receives reports generated by reporting module 114. Interface 200 may also include login button 202 and logout button 214. The login button 212 and logout button 214 may allow a user to instruct data processing environment 130 to log in or log out from a particular database, respectively.

Figure 2B:
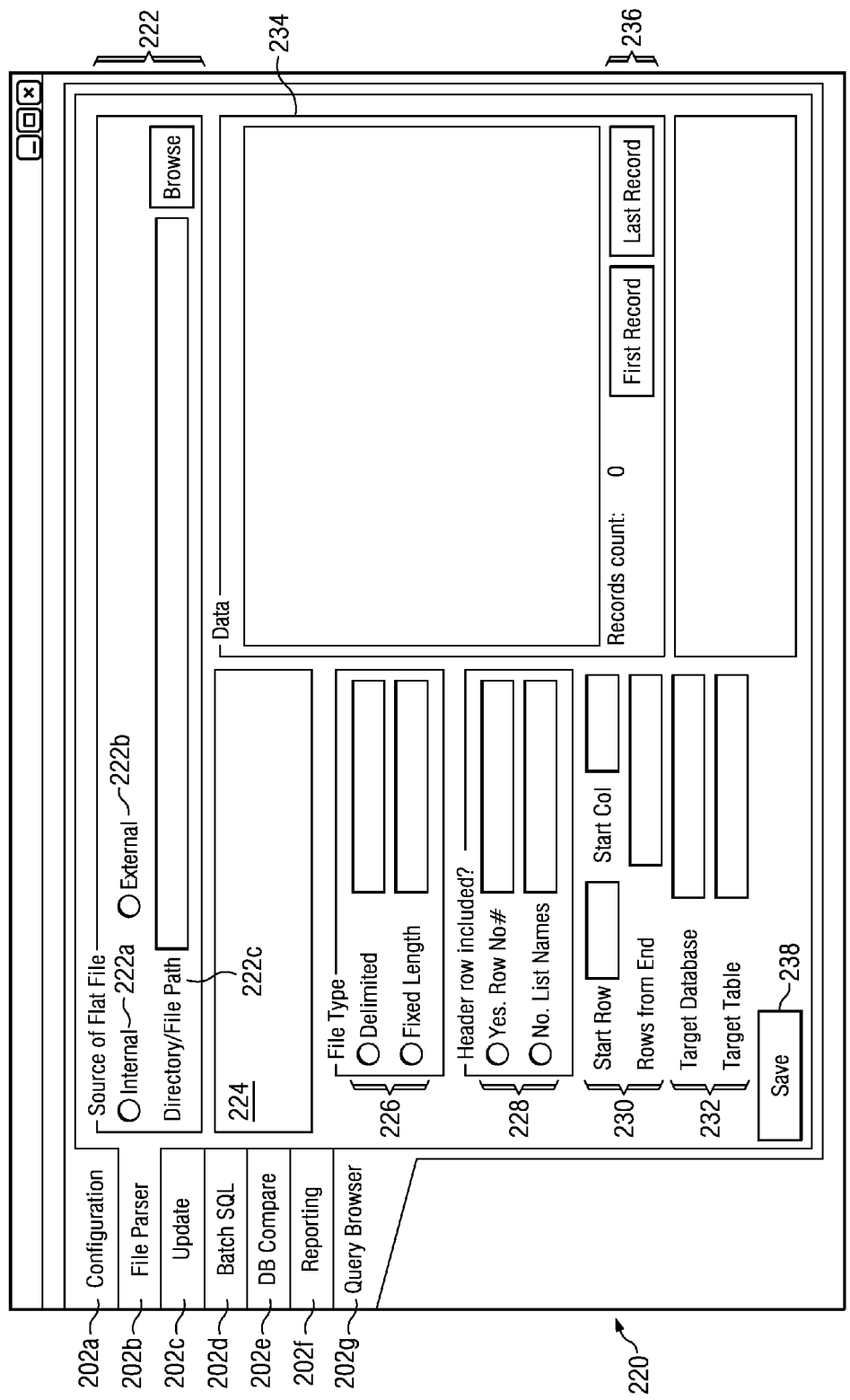
FIG. 2B illustrates an example interface for a file parsing module.

FIG. 2B illustrates an example interface for a file parsing module. When a user desires to parse a particular file, a user may gain access to interface 220. In certain embodiments, interface 220 may be implemented in GUI 136. Interface 220 may include function tabs 202 similar to function tabs 202 in FIG. 2A. In the illustrated example, function tab 202*b* is selected, indicating that a user is interfacing with parsing module 106.

Interface 220 may include file source 222. File source 222 may be any information regarding a particular file that a user desires to parse with parsing module 106. File source 222 may allow a user to specify whether the file source is internal or external. If the file source is external, file source 222 may allow a user to specify an external file path. In the illustrated example, file source 222 includes graphical element 222*a* which allows a user to specify that the file source is internal. Additionally, file source 222 includes graphical element 222*b* which allows a user to specify that the file source is external. Finally, graphical element 222*c* allows a user to browse a file system of data verification system 100 allowing the user to specify a particular file path of the file to be parsed.

Next, interface 220 may include file list 224. File list 224 may be a list of files that a user can choose from for parsing. In the illustrated example, file list 224 is a text box that may display one or more files located at a particular file path. A user may be able to then select the file from file list 224 as the file to be parsed. Interface 220 may also include file type 226.

File type 226 may be any information about the file type that allows parsing module 106 to process the selected file. For example, file type 226 may signify that a particular file contains delimiting characters or a particular file contains data of fixed length. In the illustrated example, file type 226 contains radio buttons that allow a user to select whether the file type is delimited or the file type is a fixed length. Furthermore, file type 226 contains graphical elements that allow a user to input text specifying either the delimiting character or the fixed length as appropriate.

Certain files to be parsed may contain a header row. A header row is a row of data that corresponds to columns in a table in a database. A header row is useful for providing instructions to data verification system 100 for storing data in particular columns. Interface 220 may include header row information 228. Header row 228 allows a user to specify whether a particular file has a header row. If a particular file does have a header row, header row information 228 contains a text box which will allow a user to specify a particular header row number. If it does not, header row information 228 will allow a user to list the names of the columns which will store the data contained in the particular file.

Interface 220 may include source data information 230. Source data information 230 is information that specifies a particular portion of data contained in a particular file that may be processed by parsing module 106. For example, in the illustrated embodiment, interface 220 includes a collection of text entry boxes that will allow a user to specify a starting row, a starting column, and an ending row of data for which parsing module 106 may process. Interface 220 may also include target information 232. Target information 232 provides parsing module 106 information regarding the target database that will be storing the portion of data from the particular file. In the illustrated example, target information 232 includes text entry boxes for target database and for target table. A user may input text specifying a target database and a target table for storing a portion of data from a particular file. In certain embodiments, target database may be target database 150. In certain embodiments a user may use target information 232 to specify database 150.

Interface 220 may also include file data 234. File data 234 may display various data regarding the file being processed including the data contained in the particular file. Interface 220 may also include record navigation 236. Record navigation 236 may include navigation buttons allowing a user to scroll or jump around to various portions of the data being processed by parsing module 106. A user may use save button 238 of interface 220 to save all of the options entered into interface 220. In certain embodiments, clicking save button 238 may process the particular file using parsing module 106.

Figure 2C:
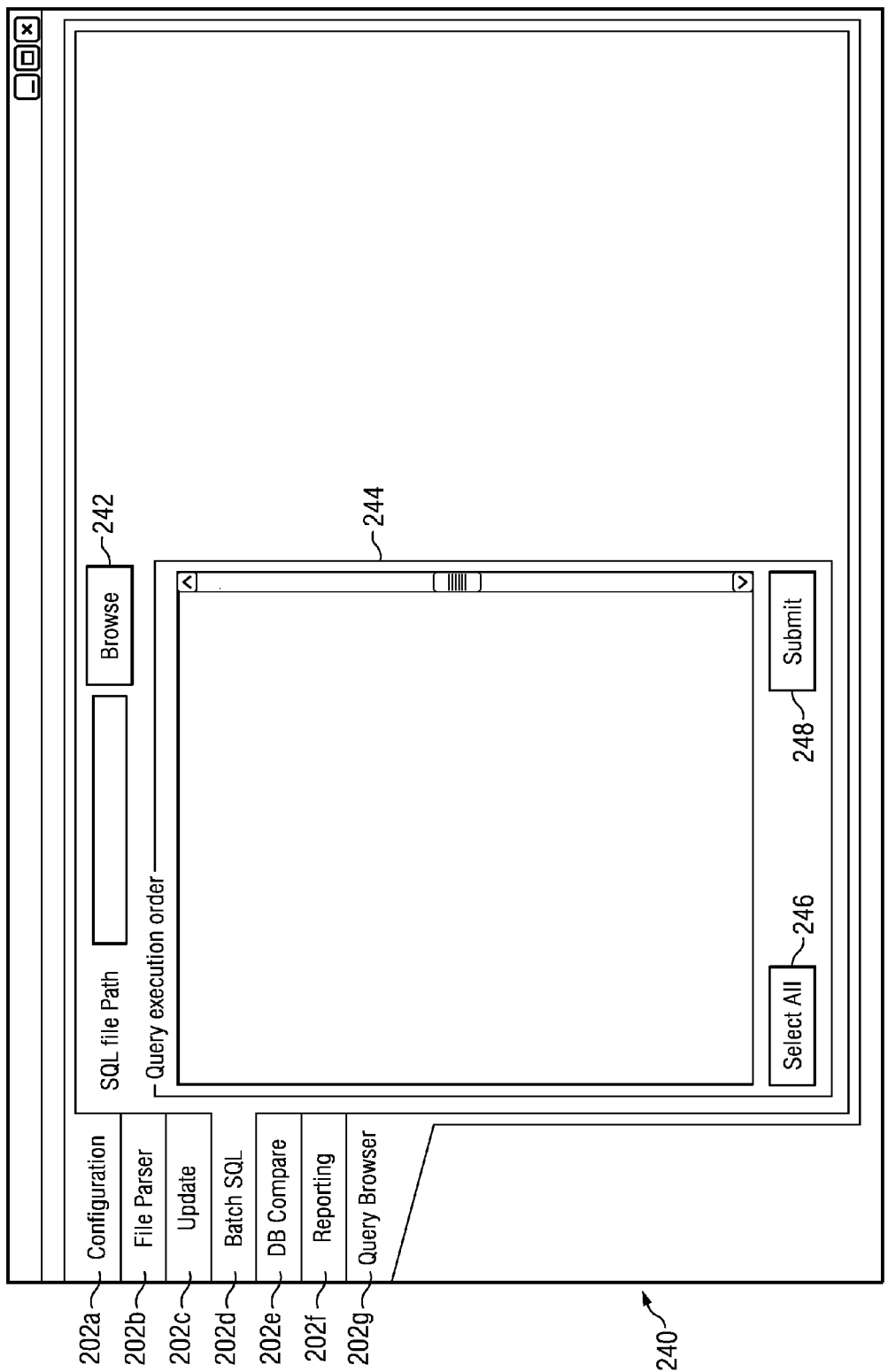
FIG. 2C illustrates an example interface for a batching module.

FIG. 2C illustrates an example interface for a batching module. A user may use interface 240 to access batching module 108 of data processing environment 130. In certain embodiments, interface 240 may be implemented in GUI 136. Interface 240 may include function tabs 202 similar to function tabs 202 in FIG. 2A. In the illustrated example, function tab 202d is selected, indicating that a user is interfacing with batching module 108.

Interface 240 may comprise file path 242. File path 242 may be information regarding the location of a particular file that may contain one or more SQL queries to process. In certain embodiments, file path 242 may be a file location for input file 170. In the illustrated example, file path 242 is a graphical element that allows a user to browse a file system to locate a particular file containing one or more SQL queries to execute. Once a user has specified file path 242, batch module 108 may process the file at file path 242 and extract one or more SQL queries from the file.

After batching module 108 has extracted one or more SQL queries from the file at file path 242, it may present them to a user in query list 244. Query list 244 may be any list that allows a user to select one or more queries to execute. In the illustrated example, query list 244 is a text box that allows a user to choose one or more SQL queries to execute. Interface 240 may also include selection button 246. Selection button 246 may give the user the ability to select all of the SQL queries that are displayed in the query list 244. Once a user is finished inputting all the information required by batching module 108, the user may click submit button 248 and batching module 108 may execute the selected one or more SQL queries in query list 244.

Figure 2D:
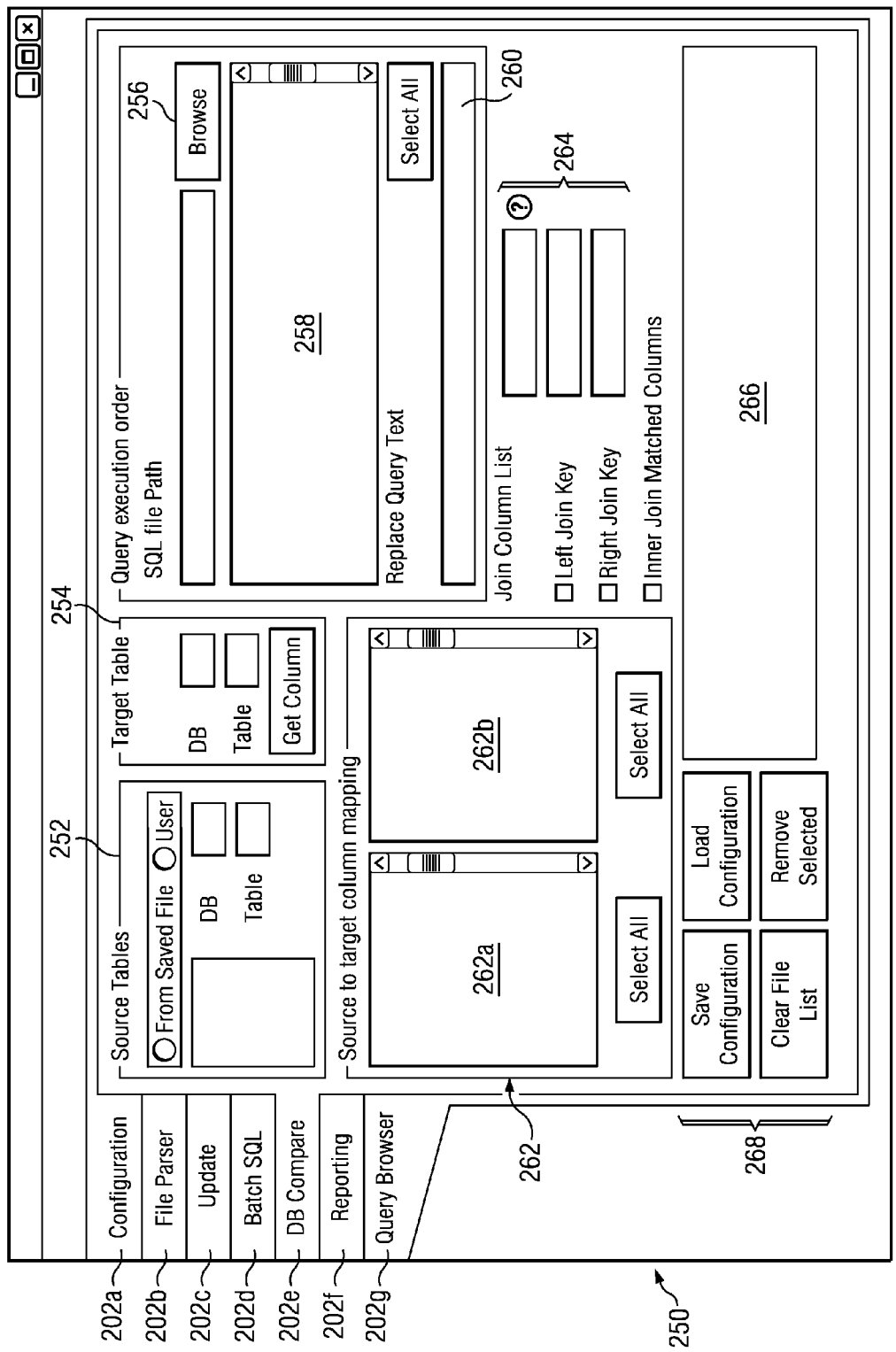
FIG. 2D illustrates an example interface for a comparison module.

FIG. 2D illustrates an example interface for a comparison module. A user may access the functionality of comparison module 112 through interface 250. In certain embodiments, interface 250 may be implemented in GUI 136. Interface 250 may include function tabs 202 similar to function tabs 202 in FIG. 2A. In the illustrated example, function tab 202e is selected, indicating that a user is interfacing with comparison module 112.

Interface 250 may include source table 252. Source table 252 may be a collection of options that a user can input indicating a particular source of data to be compared. For example, source table 252 may include graphical elements that allow a user to choose whether the source table should be pulled from a saved file or from a database. If the source is a source file, source table 252 allows the user to specify the source file name. If the source is from a source database, source table 252 allows the user to specify a particular table in a particular database containing source data. In certain embodiments, a saved file specified in source table 252 may be input file 170. In certain embodiments, source table specified in source table 252 may be source database 160.

Interface 250 may also include target table 254. Target table 254 a user to specify information regarding a table storing data against which source data will be compared. In the illustrated example, target table 254 includes graphical elements that allow a user to specify a particular database and a particular table in that database. Furthermore, target table 254 may include a button that allows a user to retrieve all columns from a target table. In certain embodiments, target table 254 may be information regarding target database 150.

Interface 250 may also include file path 256. File path 256 may be a path of a file that contains one or more SQL queries that a user desires to execute. For example, the one or more SQL queries may be comparison queries that a user wishes for comparison module 112 to execute. Once a user has specified file path 256, queries contained in the file at file path 256 may be displayed in query list 258. In the illustrated example, query list 258 is a text box that may display one or more queries that a user can select. Interface 250 may also include query replace text box 260. Query replace text box 260 can be used by a user to replace a certain portion of one or more queries that are listed in query list 258.

Additionally, a user may provide information to comparison module 112 specifying which portions of the source data correspond to portions of the target data. A user may do this using column mapping information 262. Column mapping information 262 allows a user to specify one or more columns from the source data through graphical element 262a. A user may also specify one or more columns to compare source data against through graphical element 262b. Graphical elements 262*a* and 262*b* may be used by comparison module 112 as instructions for correlating structure of the source data to structure of the target data.

Next, interface 250 includes column join information 264. Column join information 264 allows a user to join one or more tables combining the data of the one or more tables into one table. Column join information 264 has graphical elements for allowing a user to input the particular columns that the user wants to join. Additionally, column join information 264 also presents options for a user to specify whether the user desires to execute a left outer join or a right outer join. If a user chooses to conduct either a left outer join or a right outer join, a user may then specify a column key that can be matched up to implement an outer join. This information can be used by comparison module 112 to perform an outer join operation on the source and/or target data. Furthermore, interface 250 may include saved file location 266. Saved file location 266 may present the user with information where the result of the comparison may be stored. Finally, interface 250 may also include file storage options 268. File storage options 268 allow a user to save a particular configuration implemented in interface 250. File storage options 268 may also provide a user the ability to load a particular configuration for interface 250 as well as resetting various information entered into interface 250.

Figure 2E:
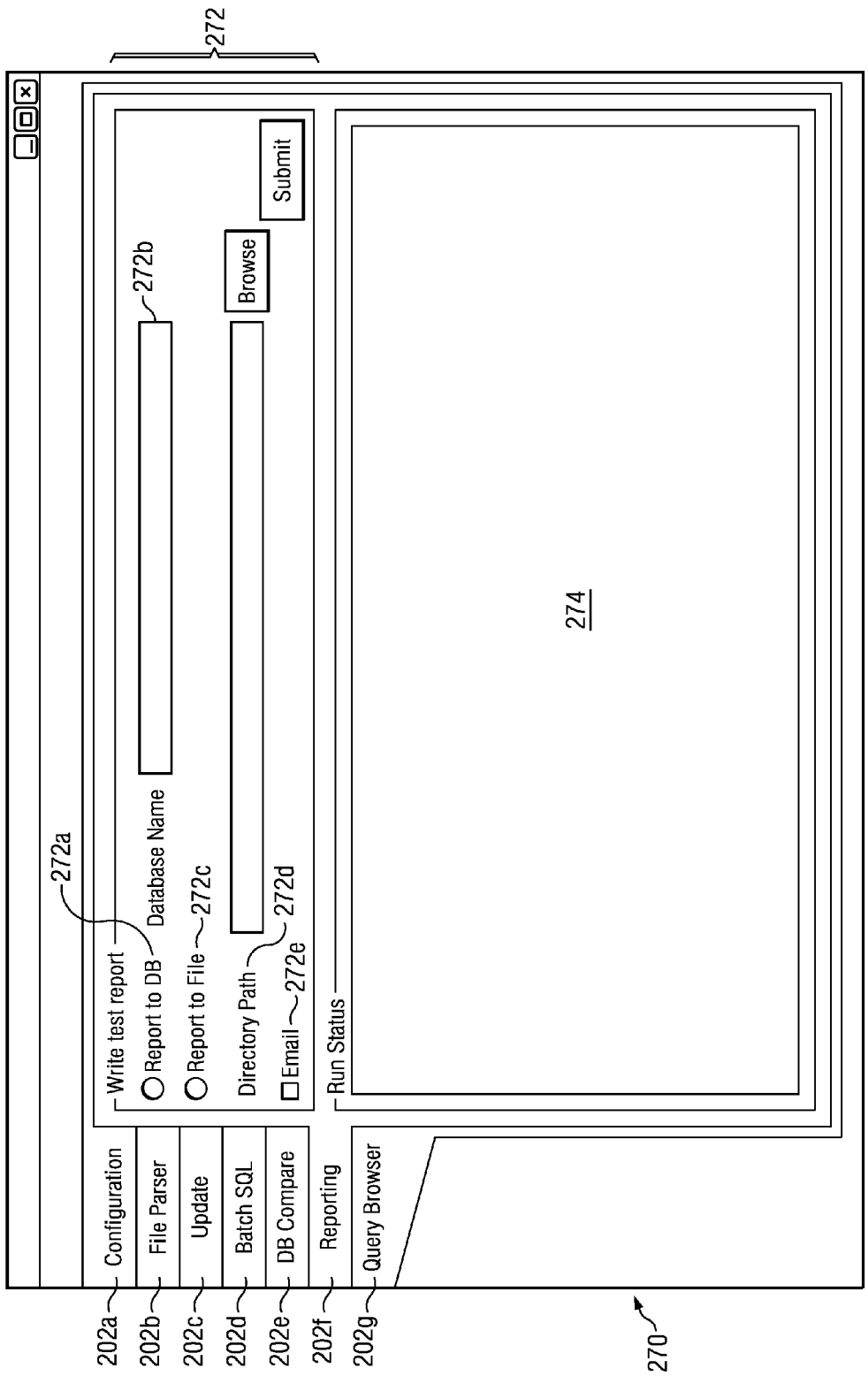
FIG. 2E illustrates an example interface for a reporting module.

FIG. 2E illustrates an example interface for a reporting module. A user may use interface 270 to access the functionality of reporting module 114. In certain embodiments, interface 270 may be included in GUI 136. Interface 270 may include function tabs 202 similar to function tabs 202 of FIG. 2A. In the illustrated example, function tab 202*f* is selected indicating that a user is interacting with reporting module 114.

Interface 270 includes a variety of graphical elements that allow a user to specify information that can be utilized by reporting module 114 to store the results of various functionality implemented by data processing environment 130. For example, interface 270 may include report information 272. Report information 272 provides options to the user to specify where to save results of a particular function executed by data process environment 130. In the illustrated example, report information 272 includes report database option 272*a* which allows a user to specify a database for storing the results of a function executed by data processing environment 130. If a user selects report database option 272*a*, the user may input a particular database name or location into the text box of report database location 272*b*.

In the illustrated example, a user may choose instead to store the results of a particular function executed by data processing environment 130 in a particular file. In such an instance, a user may use report file option 272*c* to signify to data processing environment 130 that the results should be stored in a file rather than in a database. In the illustrated example, if a report file 272*c* is selected, then a user may input a file path in report file location 272*d*.

Additionally, a user may desire to email the results of data processing environment 130 executing a particular function. In such an instance, a user may select email option 272*e*. Email option 272*e* signifies that results will be emailed to an email address that may have been specified to data processing environment 130 using interface 200 of FIG. 2A. Finally, interface 270 may also include run status 274. Run status 274 is a graphical element in interface 270 that displays results of a particular function being executed by data processing environment 130. In certain embodiments, the results displayed in run status 274 may be the results stored in a particular target file or database. According to some embodiments, run status 274 may simply be a message that a particular function has been executed successfully or unsuccessfully.

Figure 2F:
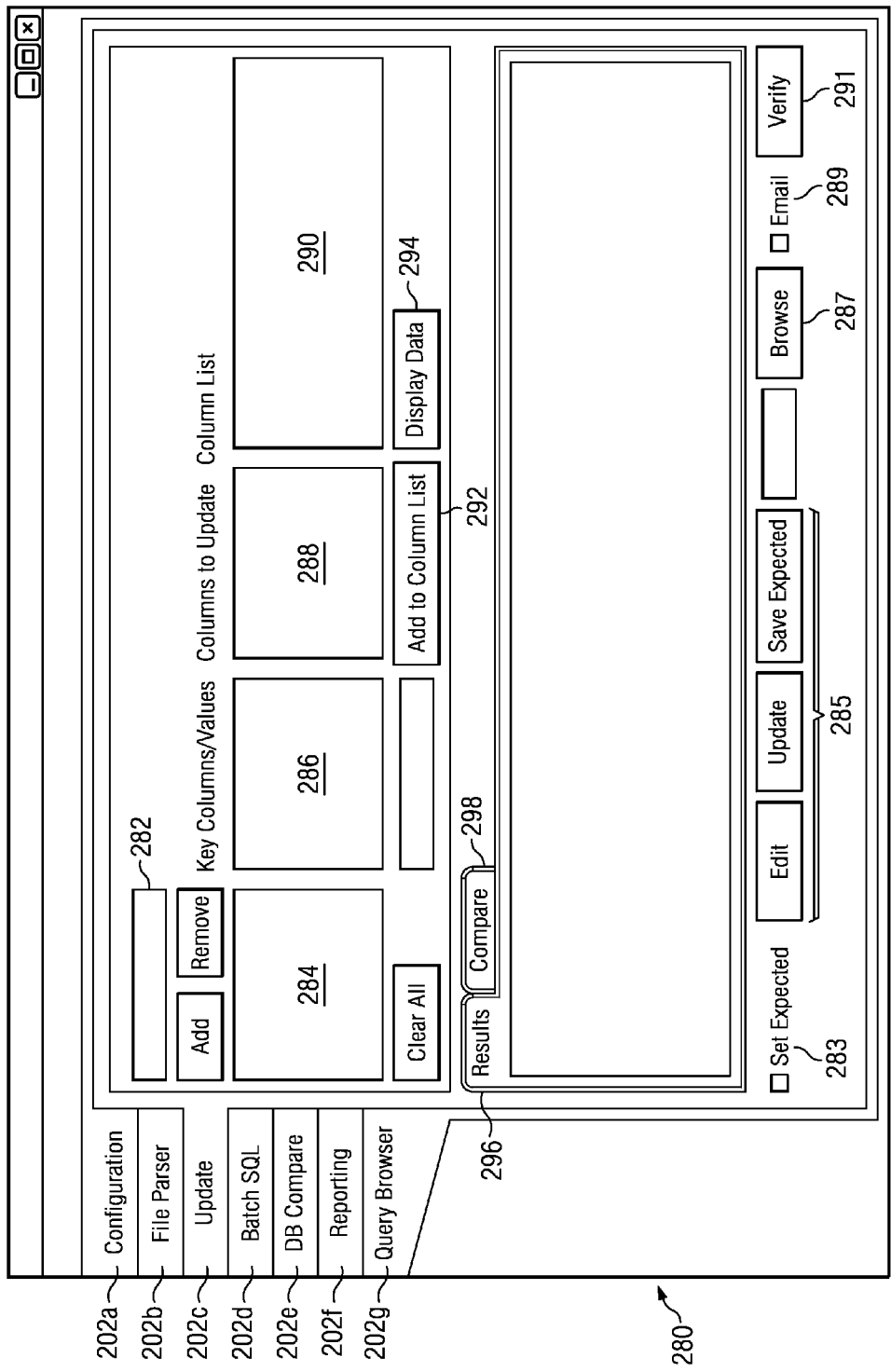
FIG. 2F illustrates an example interface for a data update and verification module.

FIG. 2F illustrates an example interface for a data update and verification module. Interface 280 allows a user to interact with data update and verification module 116. In certain embodiments, interface 280 may be a part of GUI 136. Interface 280 may include function tabs 202 similar to function tabs 202 of FIG. 2A. In the illustrated example, function tab 202*c* is selected indicating that a user is interacting with data update and verification module 116.

Interface 280 may include table name 282. Table name 282 allows a user to specify a particular table that will store particular data or be involved in the verification process. In the illustrated example, table name 282 is a text box that allows a user to specify a particular table name. In certain embodiments, table name 282 may be a table contained within target database 150, a table contained in database 160, or a table constructed from input file 170. Interface 280 may also include table list 284. Table list 284 may be a list of tables entered by a user into table name 282. A user may have options of adding additional tables or removing tables using the add or remove buttons of table list 284.

Next, a user may be able to specify key columns contained in a particular table using key columns 286. In the illustrated example, key columns 286 is a text box that is capable of displaying the key columns contained in the tables in table list 284. Interface 280 may also contain columns 288. Columns 288 represents columns into which a user may insert data. In the illustrated example, columns 288 is a text box capable of displaying chosen columns. A user may specify particular columns in columns 288 or key columns 286 by using column list 290. Column list 290 may display a list of retrieved columns from selected tables entered by the user. Column list 290, in the illustrated example, is a text box which may display one or more columns contained in the listed tables in table list 284. A user is able to interact with column list 290 and select one or more columns to add to key columns 286 or columns 288. A user may add a particular column from column list 290 by clicking column list button 292.

In certain instances, a user may wish to view the data of a particular column before adding the column to a particular list. A user may do this by clicking data display button 294. By clicking data display button 294, a user is instructing data processing environment 130 to retrieve data from a particular column and to display it in interface 280. Data retrieved from a particular column may be displayed in results box 296. Additionally, a user may use results box 296 to interact with the data being displayed. Results box 296 may display all of the data included in the selected columns of particular tables by the user.

Once data is displayed in results box 296, a user may interact with the data by clicking one or more cells of the data and then specifying a new value to be stored in those selected one or more cells. In some instances the user may wish to store the data as an "expected results set." Expected results set may be data that a user has deemed to be "correct." This is the data that data update and verification module 116 may compare against to determine if a certain set of data is verified. If a user wishes to update the expected results dataset, then the user may check expected data flag 283 or else the user can leave expected data flag 283 unchecked. Leaving expected data flag 283 unchecked, the user can specify to data update and verification module 116 that the entered data should be compared against the expected results dataset. In certain embodiments, expected results dataset may be stored in target database 150. If the user does want to compare entered data with data in the expected results dataset, the user may click the comparison tab 298. Comparison tab 298 is a text box that is capable of displaying the results of a comparison between source data and target data.

The user may use edit buttons 285 to interact with the data displayed in results 296. For example, a user may click the edit button after selecting one or more cells. Clicking the edit button will allow the user to edit the data in the selected one or more cells. Clicking the update button may commit to storage the data entered in results box 296. Finally, the save expected button of configuration 285 may be pressed by a user after setting the expected data flag 283. By clicking the save expected button of configuration 285, a user may store the current data in results box 296 as expected results data. Finally, a user may click verification button 291. Verification button 291 verifies whether a particular set of source data matches expected results data. Results of this verification may be displayed in results box 296 or, if the user has checked email report flag 289, the verification results may be emailed to a particular email address.

FIG. 3 illustrates example comparison data. Example comparison data 300 may be used by the example system of FIG. 1. The example comparison data 300 of FIG. 3 is the content of a file that may include one or more SQL query strings. For example, comparison data 300 may be contained in input file 170 or retrieved from source database 160. In certain embodiments, comparison data 300 may be used by comparison module 112, batching module 108, or any other component of data verification system 100 that is suitable for a particular purpose.

Comparison data 300 may be in the format of a text file, comma separated values file, an extensible markup language file, or any other file format capable of containing one or more SQL search queries. Comparison data 300 may contain query block 302. Query block 302 signifies a portion of comparison data 300 containing one or more SQL queries. For example, query block 302 contains query 304 and query 306. Query 304 is an SQL query that may be executed by source database 160, target database 150, or any other component of data verification system 100. Query 304 is an example of an "update" query capable of being implemented in a particular database. Query 304 may also have additional information regarding a particular SQL query. For example, query 304 may include an expected data type and it may also include a label for a particular SQL query. In the illustrated example, query 304 contains a data type of "text" and a name of "query1." Query 306 is an example of a deletion SQL query. Query 306 also contains a data type of "text" and is named "query2." In certain embodiments, query block 302 may be processed by batching module 108. Query 304 and query 306 may be SQL queries that are extracted by batching module 108 and displayed to a user using GUI 136. Example comparison data 300 may also include comparison block 308.

Comparison block 308 includes queries that may be used to compare data from a source data location to data contained in a target data location. For example, query 310 may include an SQL query intended to pull data out of source database 160. Query 312 may be an SQL query intended to pull data out of target database 150. Collectively, query 310 and query 312 have an expected data type of "text" and a name of "case1." Comparison block 308 also includes queries 314 and 316. Queries 314 and 316 are further examples of SQL queries that can be used by any component of data verification system 100 to compare one dataset to another dataset. For example, query 314 might select data from source database 160. Query 316 may select data from target database 150. Collectively, queries 314 and 316 have a data type of "text" and a name of "case2." Comparison block 308 may be used by comparison module 112, data update and verification module 116, and/or any other component of data processing environment 130 capable of processing comparison SQL query strings.

Figure 4:
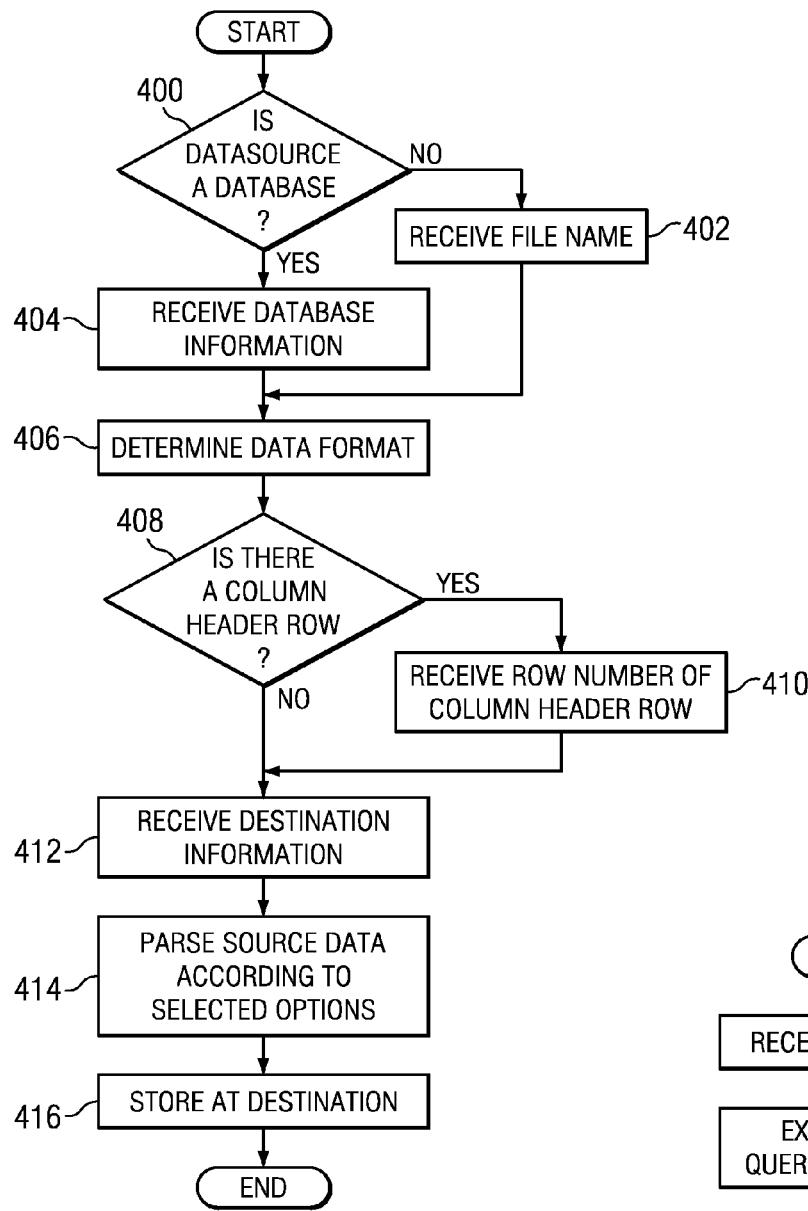
FIG. 4 illustrates an example method for parsing a file.

FIG. 4 illustrates an example method for parsing a file. The example method of FIG. 4 may be performed by example data verification system 100 of FIG. 1 according to certain embodiments of the present disclosure. The method may be implemented in any suitable combination of software, firmware, and hardware. Although particular components may be identified as performing particular steps, the present disclosure contemplates any suitable components performing the steps according to particular needs.

The example method begins at step 400. Parsing module 106 may be used to process particular data from a data source such as a database or a data file. In certain embodiments, parsing module 106 may process data from source database 160 or data from input file 170. Parsing module 106 may determine a source location of the data to be processed. In certain embodiments, a user may use GUI 136 of workstation 110 to specify a source location of data to be processed by parsing module 106. Parsing module 106 may determine whether the source location of data is a database or a file. If the source location is a database, the example method may proceed to step 404. Otherwise, the example method may proceed to step 402. At step 402, parsing module 106 may receive a file name. For example, a user may have specified a file name using GUI 136 of workstation 110. In response, workstation may communicate message 126 to data processing environment 130. Message 126 may comprise the name of a particular file to process. The example method may proceed to step 406.

At step 404, workstation 110 may communicate message 126 to data processing environment 130, wherein message 126 may comprise a request to process a database as a source of data. Message 126 may further comprise information regarding the database containing the data.

At step 406, a user may use GUI 136 of workstation 110 to specify a data format of the source data. For example, a user may use GUI 136 to specify whether the data is delimited by a specific character and/or whether the data has a specific length. Workstation 110 may communicate this information to data processing environment 130 via message 126. At step 408, data processing environment 130 may determine whether there is a column header row. For example, a user may specify whether the source data includes a row of headers corresponding to columns in target database 150. If there is a column header row, the example method may proceed to step 410. Otherwise, the example method may proceed to step 412. At step 410, data processing environment 130 may receive a particular row number of the source data that includes a row of headers corresponding to columns in target database 150. For example, a user may specify this information using GUI 136. Workstation 110 may then communicate this information via message 126 to data processing environment 130.

At step 412, data processing environment 130 may receive source destination information. For example, a user may use GUI 136 of workstation 110 to specify information regarding target database 150. A user may type in a particular table of target database 150 which will store the data from a data source. Workstation 110 may communicate some or all information regarding the source data and target database 150 by communicating message 126 over network 120 to data processing environment 130.

At step 414, parsing module 106 may use information contained in message 126 to process the data from the source data according to the parameters specified by the user. For example, parsing module 106 may access input file 170 by communicating message 124 over network 120 to files 170. Message 124 may contain a request to access files 170. In response to message 124, parsing module 106 may access files 170. Similarly, parsing module 106 may determine that source data is located in source database 160. Parsing module 106 may communicate message 122 over network 120 to source database 160. Message 122 may comprise a request to access source database 160. In response to message 122, parsing module 106 may then access data contained in database 160. Parsing module 106 may then process the source data according to processing information received from the user.

At step 416, after processing the data according to the user's specifications, parsing module 106 may then store the data at a target destination. For example, parsing module 106 may be instructed to store the processed source data in target database 150. Parsing module 106 may communicate message 118 over network 140 to target database 150. Message 118 may contain a request to store processed source data in a particular portion of target database 150. In response to message 118, processed source data may be stored in target database 150.

Figure 5:
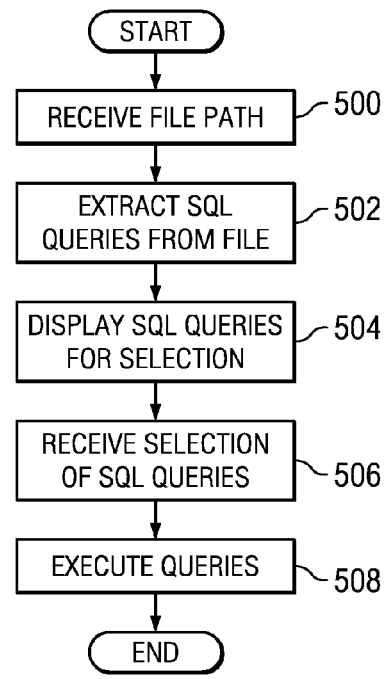
FIG. 5 illustrates an example method for executing batch queries.

FIG. 5 illustrates an example method for executing batch queries. The example method of FIG. 5 may be performed by example data verification system 100 of FIG. 1 according to certain embodiments of the present disclosure. The method may be implemented in any suitable combination of software, firmware, and hardware. Although particular components may be identified as performing particular steps, the present disclosure contemplates any suitable components performing the steps according to particular needs.

The example method begins at step 500. Batching module 108 may receive a location containing one or more SQL queries. For example, a user may use GUI 136 of workstation 110 to specify a particular location of input file 170. Workstation 110 may communicate message 126 to data processing environment 130. Message 126 may comprise a request to process input file 170. At step 502, in response to message 126, batching module 108 may access input file 170. Batching module 108 may then process input file 170. For example, batching module 108 may analyze the contents of input file 170 and extract one or more SQL queries from input file 170.

At step 504, batching module 108 may communicate message 126 to workstation 110. Message 126 may comprise a request to display the various contents of input file 170. In response, the SQL queries extracted from input file 170 may be displayed in GUI 136 of workstation 110 for selection by a user. At step 506, a user may use GUI 136 to select one or more SQL queries presented in GUI 136. After selecting one or more of the extracted SQL queries from input file 170, a user may instruct batching module 108 to execute the selected SQL queries. For example, a user may use GUI 136 of workstation 110 to select one or more SQL queries extracted from input files 170. Workstation 110 may then communicate message 126 to data processing environment 130, message 126 comprising a request to execute the one or more SQL queries contained in message 126. At step 508, in response to message 126, batching module 108 may execute the SQL queries contained in message 126.

Figure 6:
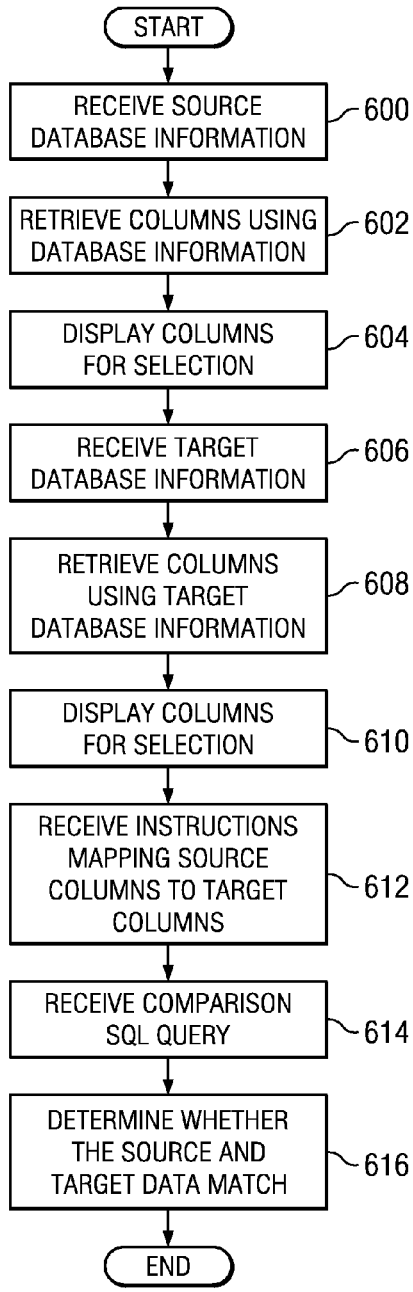
FIG. 6 illustrates an example method for database comparison.

FIG. 6 illustrates an example method for database comparison. The example method of FIG. 6 may be performed by example data verification system 100 of FIG. 1 according to certain embodiments of the present disclosure. The method may be implemented in any suitable combination of software, firmware, and hardware. Although particular components may be identified as performing particular steps, the present disclosure contemplates any suitable components performing the steps according to particular needs.

The example method begins at step 600. Comparison module 112 may receive a location for source data. In certain embodiments, the location of source data may be for input file 170 or source database 160. For example, a user may use GUI 136 of workstation 110 to specify a particular source file location. Workstation 110 may communicate message 126 over network 120 to data processing environment 130, message 126 comprising a source data location as well as a request to compare two collections of data. At step 602, in response to message 126, comparison module 112 may gain access to data at the source location. Comparison module 112 may retrieve the structure of the data at the source location. For example, comparison module 112 may retrieve columns containing the data at the source location.

At step 604, comparison module 112 may present the structure of the source data to a user. For example, comparison module 112 may communicate message 126 over network 120 instructing GUI 136 to display the structure of the collection of source data. In certain embodiments, displaying the structure of the source data may comprise displaying columns of the table containing the source data. At step 606, a user may specify a location of target data. In certain embodiments, the location of the target data may be the location for target database 150. The user may input the location of target data using GUI 136 of workstation 110. Workstation 110 may communicate message 126 over network 120 to data processing environment 130. Message 126 may comprise the location of the target data.

At step 608, comparison module 112 may access data at the location for target data. For example, comparison module 112 may take the location of a target data and communicate message 118 over network 140 to target database 150. In response, comparison module 112 may gain access to target database 150. Comparison module 112 may collect information regarding the structure of the collection of target data. At step 610, after collecting this information, comparison module 112 may communicate message 126 to workstation 110. Message 126 may comprise a request to display the structure of the collection of target data to be displayed in the GUI 136. In certain embodiments, the structure of the collection of target data may comprise the columns of the table containing the target data in target database 150.

At step 612, a user may use GUI 136 of workstation 110 to signify which portions of the source data correspond to portions of the target data. In certain embodiments, the user may use GUI 136 to select one or more columns of one or more tables containing the source data. The user can use GUI 136 to specify one or more columns containing target data, wherein the columns containing target data correspond to the columns containing source data. Workstation 110 can communicate message 126 to data processing environment 130, message 126 containing the user's mapping of the structure containing source data to the structure containing target data.

At step 614, a user may specify one or more comparison SQL queries for data processing environment 130 to execute. For example, a user may specify a file containing one or more SQL queries using GUI 136 of workstation 110. Workstation 110 may communicate message 126 to data processing environment 130. Message 126 may include the file location of a file containing one or more comparison SQL queries. In response, comparison module 112 may access the file containing the one or more comparison SQL queries. Comparison module 112 may then instruct GUI 136 to display the one or more SQL queries contained in the file at the specified location. A user can use GUI 136 to select one or more comparison SQL queries to compare the source data to the target data. For example, a user may use GUI 136 of workstation 110 to specify one or more comparison SQL queries. Workstation 110 may then communicate message 126 to data processing environment 130, message 126 including the one or more comparison SQL queries.

At step 616, comparison module 112 may determine whether the source and target data match by executing the one or more comparison SQL queries. Furthermore, comparison module 112 may store the results of the comparisons in memory 104 or any other storage location suitable for a particular purpose.

Figure 7:
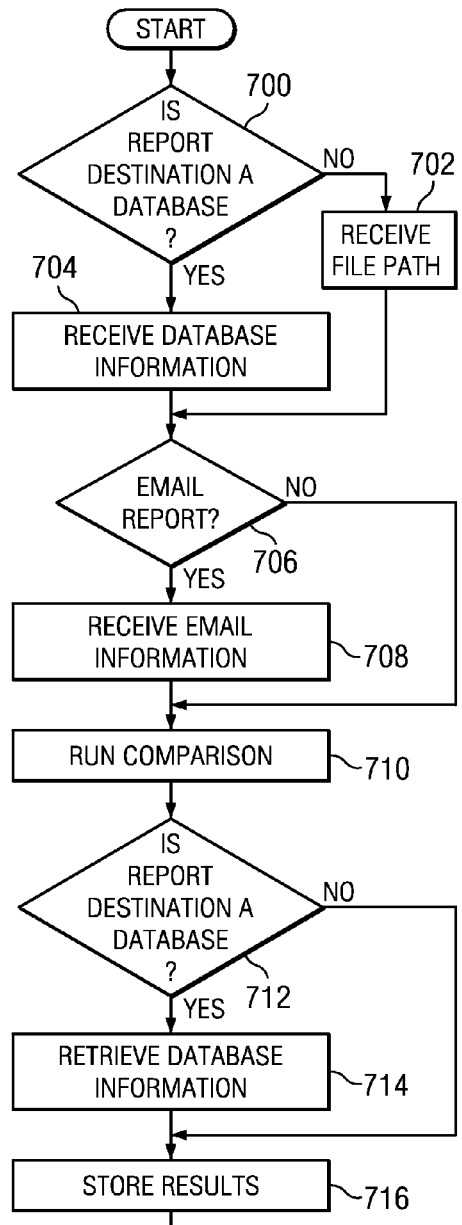
FIG. 7 illustrates an example method for reporting comparison results.

FIG. 7 illustrates an example method for reporting comparison results. The example method of FIG. 7 may be performed by example data verification system 100 of FIG. 1 according to certain embodiments of the present disclosure. The method may be implemented in any suitable combination of software, firmware, and hardware. Although particular components may be identified as performing particular steps, the present disclosure contemplates any suitable components performing the steps according to particular needs.

The example method begins at step 700. After one or more functions have been performed by data processing environment 130, data processing environment 130 may provide results to a user via reporting module 114. Reporting module 114 may determine whether the destination for the results report is a database or a file. If reporting module 114 determines that the destination is a file, the example method may proceed to step 702. Otherwise, the example method may proceed to step 704. At step 702, a user may use GUI 136 of workstation 110 to input a file location to store results generated by a component of data processing environment 130. Workstation 110 may communicate message 126 to data processing environment 130. Message 126 may contain a location of a file where results should be stored. The example method may proceed to step 706.

At step 704, a user may use GUI 136 of workstation 110 to specify a particular database to store results generated by any component of data processing environment 130. A user may type in the location of the particular database using GUI 136. Workstation 110 may then communicate message 126 over network 120 to data processing environment 130. Message 126 may comprise the location of a particular database to store the results as specified by the user. The example method may proceed to step 706.

At step 706, a user may specify the results generated by a component of data processing environment 130 should be emailed to a particular email address. If the user does not specify the results should be emailed, the example method may proceed to step 710. Otherwise, the example method continues to step 708. At step 708, a user may use GUI 136 of workstation 110 to specify that the results generated by a component of data processing environment 130 should be emailed to a particular email address. A user may input the email address using GUI 136 or the user may instruct data processing environment 130 to use an email address stored in a configuration file. Workstation 110 may then communicate message 126 over network 120 to data processing environment 130. Message 126 may contain a user's preference for email reporting.

At step 710, a particular functionality of data processing environment 130 is executed and results are generated. At step 712, reporting module 114 may determine whether the generated results report is bound for a database. If the report destination is not a database, the example method may proceed to step 716. Otherwise the example method proceeds to step 714. At step 714, a user may have specified target database 150 as the destination to store results generated by a component of data processing environment 130. Reporting module 114 may retrieve destination information for the destination database. The example method may then proceed to step 716.

At step 716, reporting module 114 may store the generated results. For example, reporting module 114 may communicate message 118 over network 140 to target database 150. Message 118 may contain the results of a function implemented by data processing environment 130. In certain embodiments, message 118 may simply contain user preferences for reporting results generated by a component of data processing environment 130. According to some embodiments, the generated results may be stored in a file at a location specified by a user.

Figure 8:
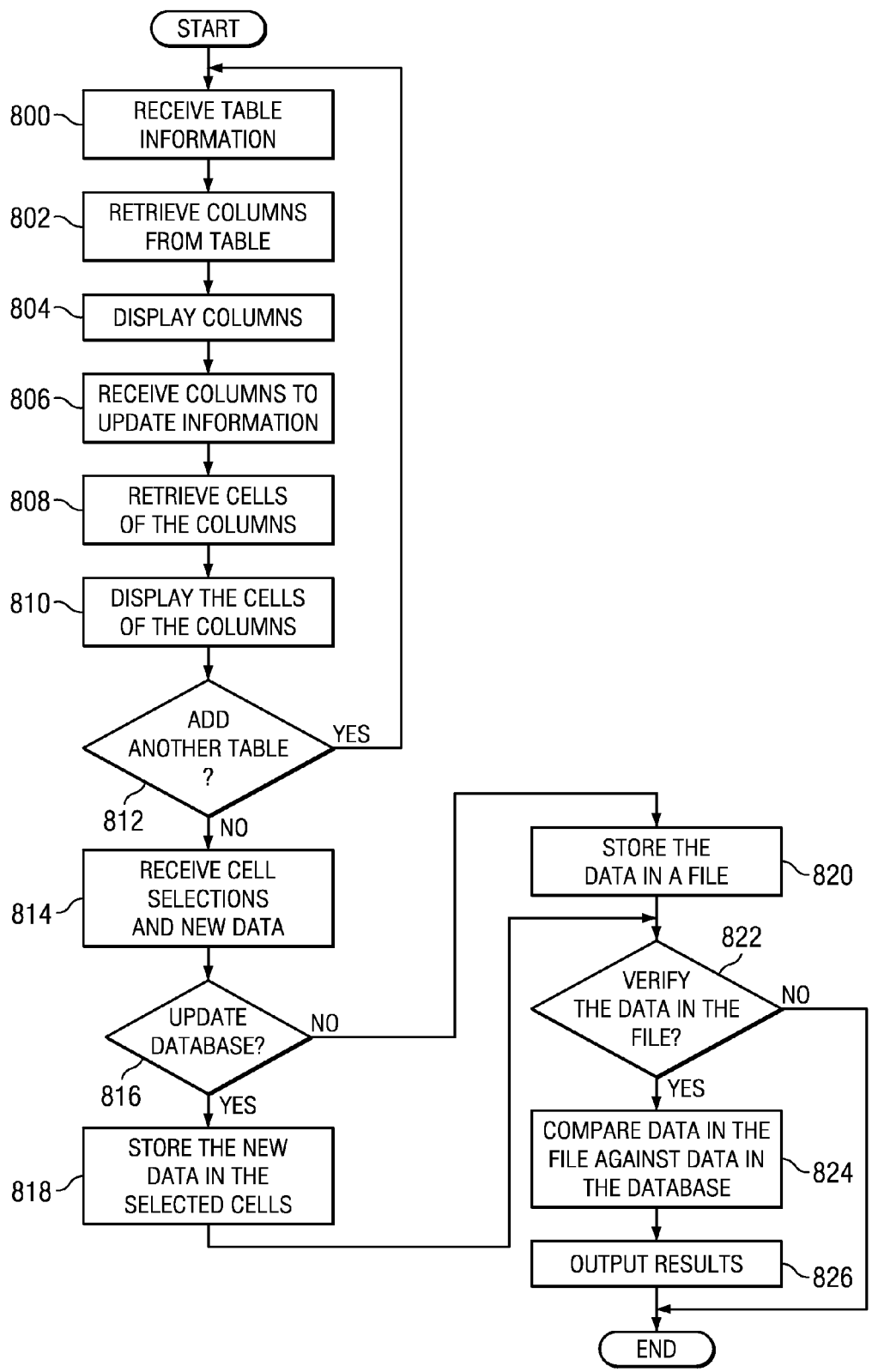
FIG. 8 illustrates an example method for updating and verifying data.

FIG. 8 illustrates an example method for updating and verifying data. The example method of FIG. 8 may be performed by example data verification system 100 of FIG. 1 according to certain embodiments of the present disclosure. The method may be implemented in any suitable combination of software, firmware, and hardware. Although particular components may be identified as performing particular steps, the present disclosure contemplates any suitable components performing the steps according to particular needs.

The example method may begin at step 800. Data update and verification module may receive table information regarding a table and a database that might store a portion of data. In certain embodiments, a user may use GUI 136 of workstation 110 to specify a particular table that is the target location for storing certain data. Workstation 110 may communicate message 126 to data processing environment 130. Message 126 may contain information regarding a table which is the destination for storing data. At step 802, in response to message 126, data update and verification module 116 may access the table and retrieve the structure of the table. For example, data update and verification module 116 may communicate message 118 over network 140 to target database 150. Message 118 may comprise a request to access the table specified by the user. In response to message 118, data update and verification module 116 may have access to database 150. At step 804, data update and verification module 116 may communicate message 126 to workstation 110. Message 126 may contain information regarding the structure of the destination table. In response to message 126, GUI 136 may present a list of columns of the destination table to a user for selection of a particular column.

At step 806, a user may use GUI 136 to choose particular columns of data for data processing environment 130 to retrieve. Workstation 110 may communicate message 126 over network 120 to data processing environment 130, message 126 containing columns of the destination table selected by the user. At step 808, data update and verification module 116 may communicate message 118 over network 140 to target database 150. Message 118 may comprise a request to access the portions of database 150 containing the selected columns. In response to message 118, data update and verification module 116 may then have access to the data contained in the selected columns of target database 150. At step 810, data update and verification module 116 may communicate message 126 to workstation 110. Message 126 may be a request to display the data in the selected columns in GUI 136. In response to message 126, GUI 136 may display the data of the selected columns of target database 150. In certain embodiments, this data may be presented as rows and columns with each intersection of a row and a column forming a cell of data. At step 812, a user may intend to repeat the process to add data from one or more columns of additional tables in target database 150. If that is the case, the example method may return to step 800. Otherwise, the example method may proceed to step 814.

At step 814, a user may begin to select particular cells of data to update. For example, a user may use GUI 136 to select one or more cells of data to update. After selecting one or more cells, the user may enter a value that should replace the current value held in those particular cells. Workstation 110 may communicate message 126 to data processing environment 130 after the user finishes entering data to replace the data currently held in the selected cells. Message 126 may contain a reference to the particular cells that the user wants to update and the particular data that the user wants to store in those selected cells.

At step 816, data processing and verification module 116 may determine whether the data should be inserted into a database or a file. In certain embodiments, a user may want to store a set of data that may be the expected results of a particular process. In such an embodiment, a user may use GUI 136 to communicate to data processing environment 130 that the data being entered into GUI 136 is intended to be set as the expected results data. Expected results data may be any data that is deemed to be "correct" data. Data processing environment 130 may then compare a particular set of data against the expected results data to determine whether the particular set of data is "correct" as well. Expected results may be stored in target database 150. In certain embodiments, if the data being stored by the user is not intended to be the expected result, data update and verification module 116 may store the data updates in an external file. If the data is intended to be stored in a database, the example method proceeds to step 818. Otherwise, the example method may proceed to step 820. At step 818, data update and verification module may communicate message 118 to target database 150 to update the selected cells according to the user's input. The example method may proceed to step 822. At step 820, data update and verification module 116 may write the results into a file corresponding to the database structure of target database 150.

At step 822, the example method determines whether particular data is intended to be verified. For example, a user may use GUI 136 of workstation 110 to initiate verification of particular data. If no verification is requested, the example method may end. Otherwise, the example method may proceed to step 824. At step 824, data update and verification module 116 may compare the data in this file to the data of target database 150 which contains the expected results data. If the data in the external file matches the expected results data held in target database 150, then data update and verification module 116 may deem the data in that file verified. At step 826, data update and verification module 116 may output the results of this verification. In certain embodiments, data update and verification module 116 may communicate these results using reporting module 114.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system comprising:
    a memory; and
    a processor communicatively couple to the memory, the processor operable to:
        receive a first electronic message indicating that a first database table is selected, by a user using a graphical user interface (GUI), from a plurality of database tables, wherein each database table is comprised of rows and columns;
        retrieve a first plurality of columns, wherein each column is associated with the first database table;
        facilitate the display, to the user, of the first plurality of columns;
        receive, after facilitating the display, to the user, of the first plurality of columns, a second electronic message indicating that a first column is selected, by the user using the GUI, from the first plurality of columns;
        receive a third electronic message indicating that at least one cell in the first column is selected by the user using the GUI;
        receive, from the user, an expected results data set, wherein the expected results data set is deemed by the user to be correct data associated with the at least one cell;
        store the expected results data set in the at least one cell;
        receive, from the user, a sample data set, wherein the sample data set is data to be verified;
        associate the sample data set with the expected results data set;
        compare the sample data set to the expected results data set, wherein comparing the sample data set to the expected results data set comprises:
            facilitating display of one or more comparison structured query language (SQL) queries to the user;
            receiving, from the user, a selection of the one or more comparison SQL queries; and
            executing the selected one or more comparison SQL queries to determine whether the sample data set matches the expected results data set;
        store a result of the determination of whether the sample data set matches the expected results data set;
        receive, from the user, new data, wherein the new data is deemed by the user to be data associated with the at least one cell;
        determine, after storing the expected results data set in the at least one cell, whether to update the expected results data set with the new data;
        when it is determined to update the expected results data set with the new data, the processor is further operable to:
            receive, from the user, a selection of at least a portion of the expected results data set to update;
            receive, from the user, at least a portion of the new data to replace the selected at least a portion of the expected results data set; and create an updated expected results data set by storing the at least a portion of the new data in the at least one cell; and when it is determined not to update the expected results data set with the new data, the processor is further operable to:

store the new data in an external file.

2. The system of claim 1, wherein associating the sample data set with the expected results data set comprises:

retrieving data mapping information, the data mapping information associating a first data element from the sample data set, wherein the first data element comprises at least a portion of the sample data set, to a second data element from the expected results data set, wherein the second data element comprises at least a portion of the expected results data set.

3. The system of claim 2, wherein comparing the sample data set to the expected results data set is based at least in part on the data mapping information.

4. The system of claim 1, wherein the processor is further operable to:

compare, after storing the expected results data set in the at least one cell, the new data to data contained in the at least one cell, wherein comparing the new data to the data contained in the at least one cell comprises:

facilitating display of one or more comparison structured query language (SQL) queries to the user;

receiving, from the user, a selection of the one or more comparison SQL queries; and executing the selected one or more comparison SQL queries to determine whether the new data matches the data contained in the at least one cell; and store a result of the determination of whether the new data matches the data contained in the at least one cell.

5. A method comprising:

receiving a first electronic message indicating that a first database table is selected, by a user using a graphical user interface (GUI), from a plurality of database tables, wherein each database table is comprised of rows and columns;

retrieving a first plurality of columns, wherein each column is associated with the first database table;

facilitating the display, to the user, of the first plurality of columns;

receiving, after facilitating the display, to the user, of the first plurality of columns, a second electronic message indicating that a first column is selected, by the user using the GUI, from the first plurality of columns;

receiving a third electronic message indicating that at least one cell in the first column is selected by the user using the GUI;

receiving, from the user, an expected results data set, wherein the expected results data set is deemed by the user to be correct data associated with the at least one cell;

storing the expected results data set in the at least one cell;

receiving, from the user, a sample data set, wherein the sample data set is data to be verified;

associating the sample data set with the expected results data set;

comparing the sample data set to the expected results data set, wherein comparing the sample data set to the expected results data set comprises:

facilitating display of one or more comparison structured query language (SQL) queries to the user;

receiving, from the user, a selection of the one or more comparison SQL queries; and executing the selected one or more comparison SQL queries to determine whether the sample data set matches the expected results data set;

storing a result of the determination of whether the sample data set matches the expected results data set;

receiving, from the user, new data, wherein the new data is deemed by the user to be data associated with the at least one cell;

determining, after storing the expected results data set in the at least one cell, whether to update the expected results data set with the new data;

when it is determined to update the expected results data set with the new data, the method further comprising:

receiving, from the user, a selection of at least a portion of the expected results data set to update;

receiving, from the user, at least a portion of the new data to replace the selected at least a portion of the expected results data set; and creating an updated expected results data set by storing the at least a portion of the new data in the at least one cell; and when it is determined not to update the expected results data set with the new data, the method further comprising:

storing the new data in an external file.

6. The method of claim 5, wherein associating the sample data set with the expected results data set comprises:

retrieving data mapping information, the data mapping information associating a first data element from the sample data set, wherein the first data element comprises at least a portion of the sample data set, to a second data element from the expected results data set, wherein the second data element comprises at least a portion of the expected results data set.

7. The method of claim 6, wherein comparing the sample data set to the expected results data set is based at least in part on the data mapping information.

8. The method of claim 5, further comprising:

comparing, after storing the expected results data set in the at least one cell, the new data to data contained in the at least one cell, wherein comparing the new data to the data contained in the at least one cell comprises:

facilitating display of one or more comparison structured query language (SQL) queries to the user;

receiving, from the user, a selection of the one or more comparison SQL queries; and executing the selected one or more comparison SQL queries to determine whether the new data matches the data contained in the at least one cell; and storing a result of the determination of whether the new data matches the data contained in the at least one cell.

9. One or more non-transitory computer-readable media comprising logic, the logic when executed by one or more processors operable to perform operations comprising:

receiving a first electronic message indicating that a first database table is selected, by a user using a graphical user interface (GUI) from a plurality of database tables, wherein each database table is comprised of rows and columns;

retrieving a first plurality of columns, wherein each column is associated with the first database table;

facilitating the display, to the user, of the first plurality of columns;

receiving, after facilitating the display, to the user, of the first plurality of columns, a second electronic message indicating that a first column is selected, by the user using the GUI, from the first plurality of columns;

receiving a third electronic message indicating that at least one cell in the first column is selected by the user using the GUI;

receiving, from the user, an expected results data set, wherein the expected results data set is deemed by the user to be correct data associated with the at least one cell;

storing the expected results data set in the at least one cell;

receiving, from the user, a sample data set, wherein the sample data set is data to be verified;

associating the sample data set with the expected results data set;

comparing the sample data set to the expected results data set, wherein comparing the sample data set to the expected results data set comprises:

facilitating display of one or more comparison structured query language (SQL) queries to the user;

receiving, from the user, a selection of the one or more comparison SQL queries; and executing the selected one or more comparison SQL queries to determine whether the sample data set matches the expected results data set;

storing a result of the determination of whether the sample data set matches the expected results data set;

receiving, from the user, new data, wherein the new data is deemed by the user to be data associated with the at least one cell;

determining, after storing the expected results data set in the at least one cell, whether to update the expected results data set with the new data;

when it is determined to update the expected results data set with the new data the method further comprising:

receiving, from the user, a selection of at least a portion of the expected results data set to update;

receiving, from the user, at least a portion of the new data to replace the selected at least a portion of the expected results data set; and creating an updated expected results data set by storing the at least a portion of the new data in the at least one cell; and when it is determined not to update the expected results data set with the new data, the method further comprising:

storing the new data in an external file.

10. The media of claim 9, wherein associating the sample data set with the expected results data set comprises:

retrieving data mapping information, the data mapping information associating a first data element from the sample data set, wherein the first data element comprises at least a portion of the sample data set, to a second data element from the expected results data set, wherein the second data element comprises at least a portion of the expected results data set.

11. The media of claim 10, wherein comparing the sample data set to the expected results data set is based at least in part on the data mapping information.

12. The media of claim 9, the logic further operable to perform operations comprising:

comparing, after storing the expected results data set in the at least one cell, the new data to data contained in the at least one cell, wherein comparing the new data to the data contained in the at least one cell comprises:

facilitating display of one or more comparison structured query language (SQL) queries to the user;

receiving, from the user, a selection of the one or more comparison SQL queries; and executing the selected one or more comparison SQL queries to determine whether the new data matches the data contained in the at least one cell; and storing a result of the determination of whether the new data matches the data contained in the at least one cell.

\* \* \* \* \*